US007736226B1

(12) United States Patent
Luciano, Jr.

(10) Patent No.: US 7,736,226 B1
(45) Date of Patent: Jun. 15, 2010

(54) METHOD FOR INCREASING BASE GAME PLAY IN A CASINO USING A JACKPOT OR PROGRESSIVE PRIZE

(75) Inventor: Robert A. Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1009 days.

(21) Appl. No.: 10/447,534

(22) Filed: May 30, 2003

Related U.S. Application Data

(60) Provisional application No. 60/384,627, filed on May 31, 2002.

(51) Int. Cl.
*A63F 13/00* (2006.01)

(52) U.S. Cl. ............................ 463/25; 463/26; 463/16; 463/18; 463/19; 463/20

(58) Field of Classification Search .................. 463/16, 463/20, 25–27, 1–6, 17, 18, 19, 40–42
See application file for complete search history.

(56) References Cited

U.S. PATENT DOCUMENTS 4,948,134 A * 8/1990 Suttle et al. ................... 463/13
6,068,552 A * 5/2000 Walker et al. ................. 463/21
6,102,799 A * 8/2000 Stupak ......................... 463/27
6,110,042 A * 8/2000 Walker et al. ................. 463/25
6,312,330 B1 * 11/2001 Jones et al. .................... 463/13
6,916,245 B1 * 7/2005 Vancura et al. ............... 463/26
2003/0104857 A1 * 6/2003 Jenkins ........................ 463/17

OTHER PUBLICATIONS

MegaJackpots Brochure, published by IGT circa Apr. 12, 2001.*
"Frequently Asked Questions" posted Aug. 5, 2001, retrieved on Dec. 5, 2008 at http://web.archive.org/web/20010805220014/http://www.musl.com/faq.shtm.*

* cited by examiner

*Primary Examiner*—Ronald Laneau
*Assistant Examiner*—Ross A. Williams
(74) *Attorney, Agent, or Firm*—Russ F. Marsden; Andrew B. Chen; Marvin A. Hein

(57) ABSTRACT

A method for creating extra profit from gaming machines (games of chance used in a casino or bingo-hall setting) using progressives, where the progressive amount shown to players is not the amount collected from game play; rather, it is the value which is the sum of payments made from an annuity purchased using the full amount of the contributions made to the progressive, called the amortized value. The amortized value is used to create player excitement and increased base game play in casino environments.

11 Claims, 3 Drawing Sheets

Source Of Extra Income
And To Whom Assigned

METHOD FOR INCREASING BASE GAME PLAY IN A CASINO USING A JACKPOT OR PROGRESSIVE PRIZE

RELATED APPLICATIONS

This application claims priority from and incorporates by reference U.S. provisional patent application No. 60/384,627, filed on 31 May 2002.

BACKGROUND OF THE INVENTION

1. Field of the Invention

This invention pertains generally to progressive awards in the field of gaming and lottery. More particularly, the invention relates to methods for funding and displaying a progressive award prize.

2. The Prior Art

Progressive award prizes in the field of gaming and lottery are known. For example, in the field of casino gaming progressive prizes are typically provided as jackpot prize pursuant to play on a slot machine or group of slot machines. Typically, the progressive prize is awarded when a qualifying award event occurs during play on the gaming device (e.g., a symbol or combination of symbols appearing on a wagered payline) or according to some other condition (e.g., random selection from a central controller).

In general, progressive prizes are funded by the play of one or more game devices. For example, a portion of each wager placed on a slot machine (e.g., 1%) may be used to fund the progressive prize. In some cases, the progressive prize may be "seeded" by the operator so that the progressive prize starts at a particular amount (e.g., a pre-determined minimum amount). As the game device or group of game devices are played, the progressive prize grows as portions of each wager contribute to the progressive prize. In some cases, the likelihood of obtaining the qualifying award event is set to a low value, and the progressive prize grows to substantially large amounts. The excitement of play on these high volatility games generates even more play from players, further increasing the progressive prize.

In accordance with the prior art implementations, the current sum of the contributions made to the progressive are its value or prize, and is displayed to the player. Where a group of gaming devices participates in the same progressive prize, a large sign or display may be used to indicate the current value of the progressive prize. The value of the progressive prize is further shown as a dynamically increasing amount, using a rollup or count-up feature, similar to other rollup indicators as odometers, for example.

The value of the progressive prize displayed to the players, while equal to the actual contributions, is not awarded as a lump sum when a player wins. What is given to a winning player is an annuity whose summed lifetime payments have the same value as the sum of the current contributions. By the same token, if a player chooses a lump sum payment instead of an annuity, the lump sum award will be the amount the aforementioned annuity would cost, which is less (usually substantively less) than the current contribution value.

By way of illustration, suppose the contributions to the progressive prize are one million dollars ($1,000,000). The progressive prize display would also indicate $1,000,000. However, the progressive prize display represents a payment over an annuity period (e.g., a twenty-five (25) year annuity). In this example, if a player were to win the progressive prize, the $1,000,000 would be paid to the player over a 25-year period. The player could elect a "face value pay off" in which case, the player would receive a reduced amount (e.g., $400,000) depending on market conditions.

This arrangement is selected in prior art progressive systems by casino operators (or progressive providers) to derive income from the progressive game. Whether a player chooses a lump sum or annuitized win, the cost to the casino is the same or within a relatively small additive factor of magnitude of each other (depending on how the programming is set up, the annuities available at the time, etc.), and is less considerably than the current sum that has been collected for the progressive. The casino or progressive operator makes profit from the progressive by keeping the difference between the lump sum or cost of the annuity and current amount collected for the progressive. Using the above example, the casino operator (or progressive provider) derives income from the difference ($600,000) between the actual contributions ($1,000,000) and the payout amount or cost of an annuity ($400,000).

Unfortunately, this arrangement while suitable for deriving a profit for the casino operator (or progressive provider), creates dissatisfaction from players who realize that the player does not win the amount actually contributed to the progressive prize, but rather a reduced amount (i.e., the pay off amount is not equal to the actual contributions to the progressive). The present invention uses a new and different business model to present a new and more exciting progressive payout to players having a different source of profit for casino operators.

BRIEF DESCRIPTION OF THE ILLUSTRATIONS

DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

The present invention is a method for funding, displaying and awarding a progressive prize which increases player interest by displaying a progressive prize amount to equal to the future annuity value of the progressive prize, rather than the face value of the prize (the actual amount collected for the progressive from the participating gaming machines). A player may chooses a lump sum payment; in such cases that would be the actual amount of collected funds for the progress; thus, the single "pay off" amount is equal to the actual contributions to the progressive fund (minus any reasonable management or handling fees, which in a preferred embodiment is a small [less than 1%] fixed percentage of the progressive contributions), rather than a reduced amount as with the prior art. Note: as used in this disclosure, "actual contributions to a progressive" or any language expressing the same or similar concept is mean to include (i) the actual amount collected for a progressive of any kind, and (ii) the actual amount collected minus any relatively small amount extracted from the collected total as a service, handling, or management fee (for example, to cover the costs of operating a progressive network operating center).

Player interest and participation are increased over the prior art due to the excitement created by the larger progressive prize (the amortized winning amount, which is the value of the prize when the annuity is purchased and the total amount of all payments summed) displayed to players. Further, the amortized winning amount will grow faster and higher than the actual cash contributions. The casino operator or gaming machine owners will realize increased revenue derived from the increased player interest and participation in the base games, rather than taking a portion of the progressive prize as profit.

Figure 1:
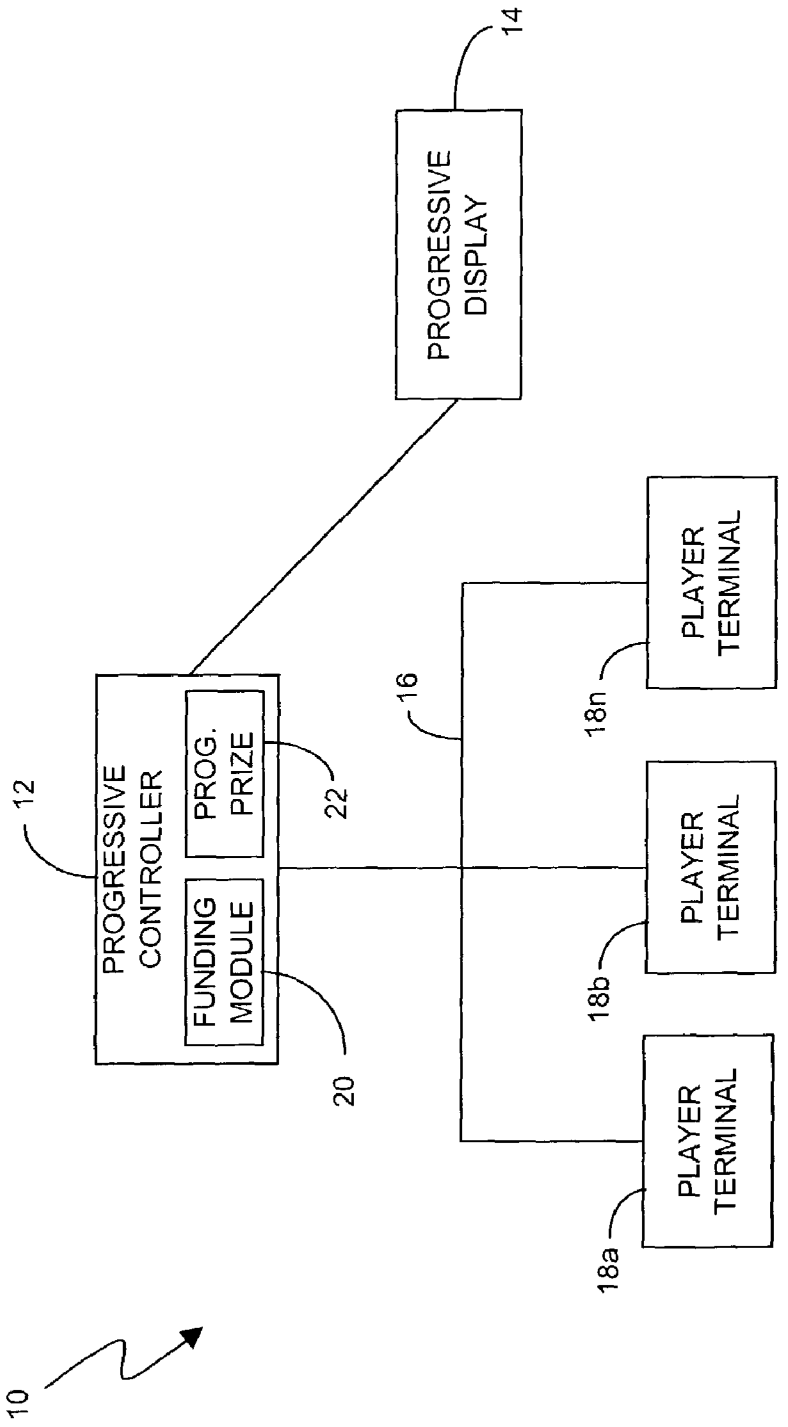
FIG. 1 is an architectural block diagram of a gaming system in accordance with the present invention.

Referring to FIG. 1, an example progressive system 10 suitable for use with the present invention is shown. The progressive system 10 includes a progressive controller 12 communicatively coupled to one or more player terminals 18*a* through 18*n*. The progressive controller 12 is also coupled for communication to a progressive display 14 which is used to indicate the current progressive award prize. Note that a standalone game (i.e., unlinked progressive) would incorporate the features of the progressive controller 12, the progressive display 14 and the player terminal 18*a*, except in a single device and without the need for network infrastructure.

The progressive controller 12 comprises a data processing device or computer suitable for carrying out the operations described herein. A suitable controller 12 generally includes a processor board having a processor coupled to a memory for data storage and input/output (I/O) interfaces for communication to I/O devices. A server operating system software provided on a memory is executed by the processor to provide typical server functionality including, among other things, providing an application layer on which the funding module 20 of the present invention operates. I/O devices, such as a display, a keyboard, a network card, a printer, may be coupled to the I/O interface of the controller 12 to provide communication with an operator and/or other devices. The progressive controller 12 executes the funding module 20 to fund a progressive prize 22 in accordance with the present invention. The operations of the funding module 20 are described more fully below in conjunction with FIG. 2.

The progressive controller 12 is coupled for communication to the player terminals 18*a* through 18*n*, normally via a network connection 16, such as ethernet for example. The progressive controller 12 may also be used to fund the progressive prize 22 through a wide area network (WAN), where two or more separate gaming sites participate in a shared progressive. In these cases, local progressive controllers each operating in a local network may then be coupled for communication with a central progressive controller through a WAN communication link. While the arrangement, cabling, and communication of a WAN is often more complex than that of a local area network (LAN), the principles of the present invention are equally suitable for use in either or both environments.

The player terminals 18*a* through 18*n* may be casino gaming devices, such as slot machines, video poker machines, or video keno machines, for example. The player terminals 18*a* through 18*n* may also be video lottery terminals (VLTs) where a player may purchase video lottery games from a central lottery controller. The present invention is also suitable for use with table games, bingo games, and other games incorporating a progressive feature.

Communication means are provided on the player terminals 18*a* through 18*n* in order to communicate wager information to the progressive controller 12 so that an accurate accounting of progressive prize contributions may be made by the progressive controller 12. The player terminals 18*a* through 18*n* also notify the progressive controller 12 when a progressive win event or other qualifying event occurs. In some cases the progressive win event or other qualifying event is determined centrally (e.g., by the progressive controller 12 or other central server). In this case, the central device communicates the win event to appropriate player terminal to notify the player of the progressive win event.

Figure 2:
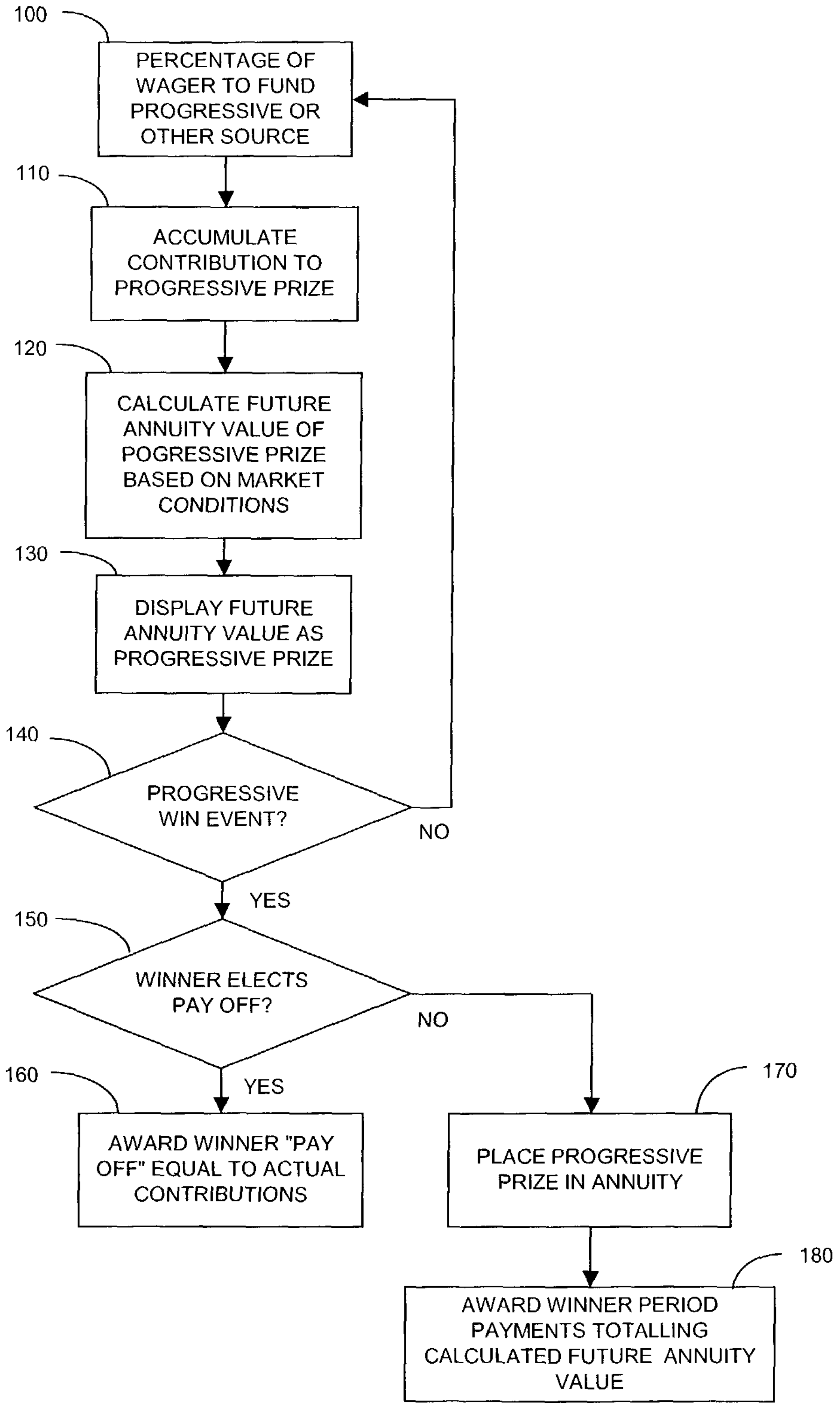
FIG. 2 is a flow diagram for progressive payouts in accordance with the present invention.

Referring now to FIG. 2, the processes of funding, displaying and awarding a progressive prize in accordance with the present invention will be now be described. The logical flow diagram of FIG. 2 depicts an illustrative way of carrying out these acts.

First at block 100, one preferred embodiment is to fund the progressive by collecting a percentage of the wagers (e.g., 1%) placed on the player terminals 18*a* through 18*n*. In this way, the player terminals 18*a* through 18*n* communicate wagering information to the progressive controller via network 16 so that the progressive controller 12 is able to calculate progressive contribution.

Also indicated in block 100 are other funding methods, any of which are readily be usable with the present invention. An example of another embodiment for funding is to take a fixed initial amount from the casino's promotional funds (the same funds used to pay for player incentives such as a promotional meals and the like) to fund the initial prize pool or jackpot amount. In this case, there could be periodic increments in the jackpot amount, such as an additional $10,000 added per week until the jackpot is won. Other funding methods may be used as well; the present invention is usable with any source of funds for the cash pool (jackpot amount). Note that in some embodiments, the jackpot may be a fixed jackpot rather than a progressive jackpot; the present invention is fully usable for any type of jackpot, fixed or growing.

At block 110, the funding module 12 accumulates the progressive contribution from each of the player terminals 18*a* through 18*n* (from Block 100) into a total progressive amount corresponding to the progressive prize 22.

At block 120, the funding module 12 then calculates the future annuity value of the actual current progressive prize 22 based on financial market conditions (e.g., current interest rates, annuity term, etc.). The future annuity value represents the total amount of the progressive award when paid over the annuity term including annuity earnings, and is normally substantially higher than the actual contributions received from the player terminals 18*a* through 18*n*.

At block 130, the progressive controller 12 then displays the calculated future annuity value of the progressive prize 22 via progressive display 14. As noted above this value is higher than the actual progressive contributions received, but is paid over the annuity term. On the other hand, the "present of face value pay off" is equal to the actual progressive contributions received. Other means for creating player interest and participation via display features may also be used, such as use large displays incorporating rollup or count-up features, for example.

At decision block 140, a determination is made as to whether a progressive win event has occurred. In some embodiments, this determination is made by the player terminals 18*a* through 18*n* pursuant to events occurring thereon. In other embodiments, this determination is made centrally (e.g., by the progressive controller 12). If a progressive win event has occurred block 150 is then carried out. Otherwise blocks 100 through 140 are repeated.

At decision block 150, a determination is made as to whether the winner of the progressive elects a "present pay off" or "period payments." If the winner elects a present pay off, block 160 is then carried out. If the winner elects period payments over the annuity period, block 170 is then carried out. In alternative embodiments, the player may not be provided a choice, in which case processing proceeds in accordance with the defined payout strategy (block 160 for present pay off; block 170 for period payments).

At block 160, the winner has elected to receive a single lump sum payment for the progressive award. In this case the winner is paid a "pay off" amount equal to the actual contributions received from the player terminals 18*a* through 18*n*. The progressive game is concluded. A new progressive game may then be started.

At block 170, the winner has elected periodic payments. The actual progressive prize (actual contributions from player terminals 18*a* through 18*n*) are then placed in an interest bearing account.

At block 180, the winner is then awarded period payments in accordance with the annuity program defined by the progressive rules (e.g., rate of pay, annuity terms). At the conclusion of all the period payments, the total payments will approximately equal the calculated future annuity value determined in block 120 and displayed to the players at block 130. The progressive game is concluded. A new progressive game may then be started.

Under this arrangement, player interest in participating in the progressive system 10 is increased because the accelerated rate in which the progressive prize display 14 amount is increased over prior art implementations. Although the casino operator (or progressive provider) does not derive income from the reduced progressive award payoff strategies in the prior art, overall revenue is increased due to the increased game play and participation which is fostered due to the larger "future annuity" progressive award which is displayed to the players. The present arrangements also relieves much of the dissatisfactions players experience when electing the "present pay off" because in accordance with the present invention, the present pay off equals to actual contributions to the progressive award, rather than a reduced amount.

As discussed above, the present invention allows the casino to display a larger payout value than prior art methods. This then enables a new and different business model to be used by casinos and progressive operators. In the past, the use of an annuity to pay out a progressive in the amount shown from the actual pay-in was beneficial to the progressive operator, but is at the expense of the owners or operators of the underlying games. The present invention is a new business model which benefits the owner or operators of the gaming machines, and not the progressive operators (if they are different, which is often the case in casino environments).

Figure 3:
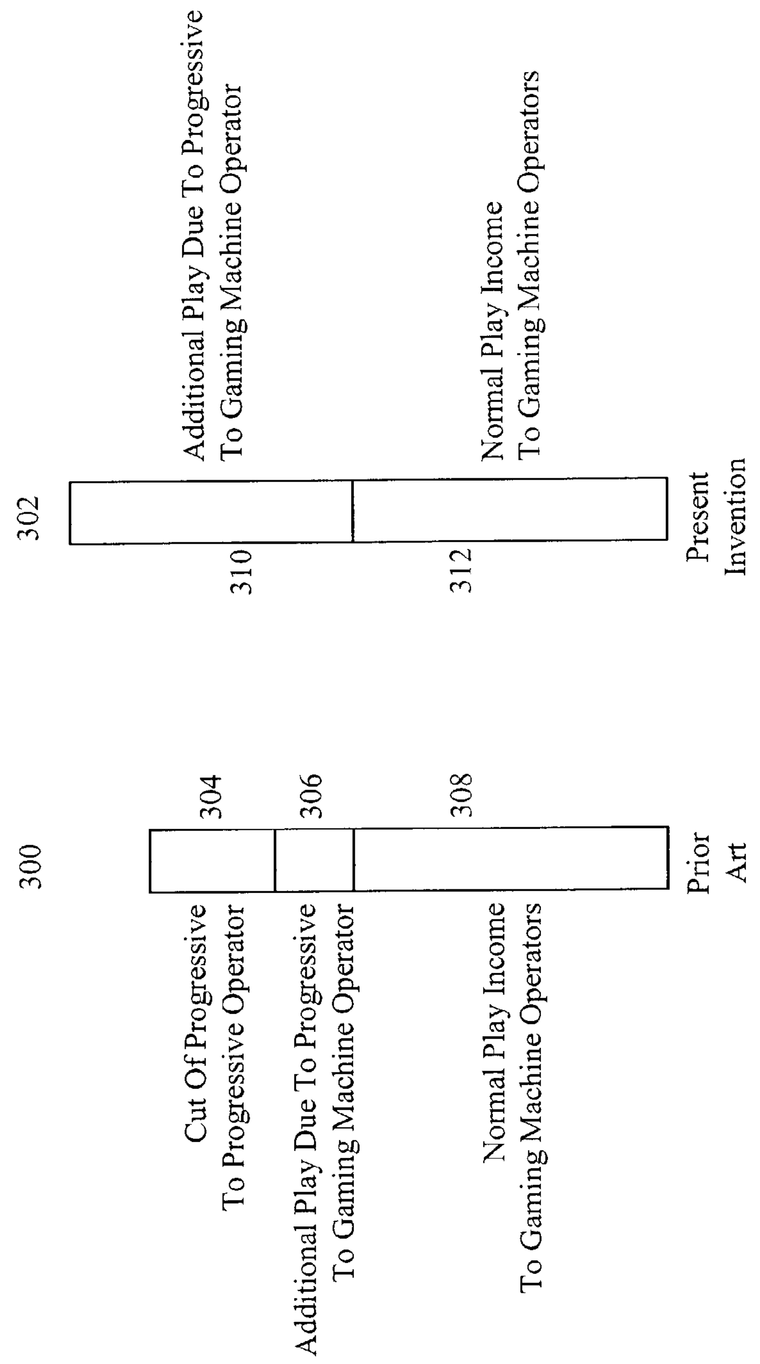
FIG. 3 is an illustration showing sources of profits in accordance with the present invention.

FIG. 3 is an illustration of the change in business models, in terms of extra income derived from the use of a progressive, as between the prior art and the present invention. Column 300 represents the prior art. The income represented by the portion of the column designated as 308 is that attained by regular play—that is, the amount of income that would be expected from the same game without a progressive. This income goes to the game owner or operator. Progressives, as is well documented in the gaming industry, create additional player interest in proportion to the possible winning amount. In the prior art, showing the actual contribution from the gaming machines on the progressive marquee, creates some additional income shown as column section 306. This additional game play benefits the same people as column portion 308. Column portion 304 represents the extra income derived by either (i) giving a progressive winner an annuity for the equivalent net amount (i.e., adding the total of all payments made over the term of the annuity) or (ii) giving the player a lump sum that is same amount as the purchase price of the annuity (the progressive operator pays out the same amount in either case). Column portion 304 makes additional income for the progressive operator. In a casino this is usually a different person or entity than the gaming machine operators or owners.

The business model of the present invention is illustrated as column 302. Column portion 312 corresponds to the normal income a gaming machine operator would expect without the additional draw of a progressive. Column portion 310 illustrates several business aspects of the present invention that are differentiable over the prior art. First, notice that the extra income is comprised of a single portion. This business model of the present invention works to the benefit of the gaming machine operators rather than the progressive operators (notice the lack of any portion of the column attributed to the progressive operators). The single column portion represents the additional game play income due to the higher player interest generated by the larger progressive amount displayed as the winning amount of the progressive. There is no portion of the progressive winnings that becomes additional income to the gaming machine or progressive operators; all the contributions made to the progressive pool (minus any expenses) are given back to the players. Thus, the business model of the present invention shows no extra income taken or extracted directly from the progressive itself.

The column portion indicated as 310 is entirely due to extra game play from the higher interest generated in players due to the higher winnable progressive amounts (so results in additional game play over the prior art, comparable to column section 306). This extra income goes directly to the gaming machine owners or operators. The business model encourages additional player interest at the expense of making any profits directly from the progressive; however, extra game play is the benefit to the gaming machine operators or owners.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

What is claimed is:

1. A method for increasing play in a casino environment having gaming machines, the gaming machines each configured to enable base game play whose outcome is based at least partially on a random event, the method comprising:

providing a progressive jackpot winnable on at least one individual gaming machine;

receiving a wager from a player playing a base game at one individual gaming machine;

assigning a predetermined portion of the wager to fund the progressive jackpot;

determining a current sum of the predetermined portion of wagers from one or more gaming machines in the casino environment;

calculating an annuitized value of the progressive jackpot using a data processing device of a progressive controller, the annuitized value being a total payout value of the progressive jackpot when invested in an annuity and paid over a period of time ending at a future date, wherein the annuitized value is based on the current sum of the predetermined portion of wagers;

displaying the annuitized value of the progressive jackpot in a manner visible to the player;

updating the current sum of the predetermined portion of the wagers;

recalculating the annuitized value with the updated sum of the predetermined portion of the wagers;

displaying the recalculated annuitized value, wherein the display of the recalculated annuitized value increments at a faster rate than actual cash contributions to the progressive jackpot; and in response to a triggering event, providing the player with an option to receive an award that is equal to a total of the current sum of the predetermined portion of wagers or an annuity funded by the total of the current sum of the predetermined portion of wagers.

2. The method of claim 1, wherein purchasing the annuity further comprises:

subtracting administrative costs of the progressive jackpot from the current sum; and using the entire remaining balance of the current sum for the purchase of the annuity.

3. The method of claim 1, wherein awarding the progressive jackpot further comprises:

subtracting administrative costs of the progressive jackpot from the current sum; and awarding the entire remaining balance of the current sum as a lump sum payment.

4. A gaming system for increasing play in a casino comprising:

a plurality of gaming machines presenting a game of chance in exchange for a wager;

means for providing a progressive jackpot winnable at one of the gaming machines;

means for funding the progressive jackpot by assigning a portion of wagers made by players playing the game of chance to the progressive jackpot;

means for keeping a current sum of the entire amount of the assigned portion of wagers;

means for calculating an annuitized value based on the current sum using a data processing device of a progressive controller, the annuitized value being a total payout value of the progressive jackpot when invested in an annuity and paid over a period of time ending at a future date, wherein the annuitized value winnable by a player is larger than the current sum, and wherein the annuitized value is based on the current sum of the predetermined portion of wagers;

means for re-calculating the annuitized value;

means for displaying the annuitized value in a manner visible to a player; and means for awarding a progressive jackpot upon the occurrence of a winning event in game of chance, wherein the means for awarding the progressive jackpot is configured to use all of the current sum as a lump sum award or to fund a purchase of an annuity.

5. The gaming system of claim 4, wherein the means for awarding a progressive jackpot further comprises:

means for subtracting administrative costs of the progressive jackpot from the current sum; and means for awarding the entire remaining balance of the current sum as a lump sum payment.

6. A method for increasing profit in a casino environment having gaming machines presenting a game of chance and an opportunity to win a progressive jackpot, the method comprising:

contributing to a progressive jackpot with promotional money or a predetermined portion of a wager;

calculating an annuitized value of the progressive jackpot based upon a current value of all contributions to the progressive jackpot using a data processing device of a progressive controller, the annuitized value being a total payout value of the progressive jackpot when invested in an annuity and paid over a period of time ending at a future date, wherein no portion of the wager is attributable as income to the gaming machine or a progressive jackpot operator, and wherein the annuitized value is based on the current sum of the predetermined portion of wagers;

displaying the annuitized value of the progressive jackpot in a manner visible to a player, wherein the annuitized value is a larger value as compared to the total contributions to the progressive jackpot, and wherein the annuitized value generates additional interest in the game of chance;

further contributing to the progressive jackpot with promotional money or the predetermined portion of the wager, wherein no portion of the contributions are attributable as income to the gaming machine or the progressive jackpot operator;

updating the annuitized value and displaying the updated annuitized value to the player, wherein the incrementation of the annuitized value is accelerated as compared to an actual cash contribution to the progressive jackpot;

determining whether a game outcome is a progressive jackpot winning event;

providing a choice selectable by a player between two payment options, one option being a lump sum payment equal to the current value of all contributions to the progressive jackpot and another option being a series of payments payable over a period of time, wherein the series of payments is funded by the current value of all contributions to the progressive jackpot;

receiving a selection from the player as to a payment option; and awarding the player the selected payment option.

7. A method for providing a progressive jackpot, the method comprising:

funding the progressive jackpot with one or more contributions from a progressive jackpot provider;

determining a current value of the progressive jackpot using a data processing device of a progressive controller by calculating an annuitized value from the one or more contributions, the annuitized value being a total payout value of the progressive jackpot when invested in an annuity and paid over a period of time ending at a future date, wherein the annuitized value is larger than a total amount of the one or more contributions, and wherein the current value of the progressive jackpot is defined as the annuitized value, and wherein the annuitized value is based on the current sum of the predetermined portion of wagers;

displaying the current value of the progressive jackpot on a progressive display for viewing by one or more players;

recalculating and displaying the current value of the progressive jackpot; and in response to a progressive jackpot triggering event, providing the player with an option to receive an annuity that is equal to the current value of the progressive jackpot, wherein the annuity is funded by the total contributions or a lump sum payment that is equal to a total of all contributions from the progressive jackpot provider.

8. The method of claim 7, wherein the progressive jackpot triggering event comprises a winning event on the base game.

9. The method of claim 7, wherein the one or more contributions are made at pre-determined times.

10. A method for increasing play in a casino environment having gaming machines that present a base game and a progressive jackpot, the method comprising:

receiving a wager from a player playing a base game on a gaming machine;

assigning a predetermined portion of the wager to fund the progressive jackpot;

calculating a future value of a total sum of the progressive jackpot using a data processing device of a progressive controller, and presenting the future value on a progressive display, wherein the total sum includes the predetermined portion of all wagers from the gaming machines in the casino environment; and providing the player with an option to receive an award that is equal to a total of the current sum of the predetermined portion of wagers or an annuity funded by the total of the current sum of the predetermined portion of wagers in response to a triggering event, wherein the total value of the annuity is equal to the future value on the progressive display.

11. The method of claim 10, further comprising funding the progressive jackpot with one or more contributions from a progressive jackpot provider.

* * * * *